(12) United States Patent
Wang et al.

(10) Patent No.: US 12,279,207 B2
(45) Date of Patent: Apr. 15, 2025

(54) SIGNAL TRANSMISSION METHOD, APPARATUS, AND DEVICE

(71) Applicant: DATANG MOBILE COMMUNICATIONS EQUIPMENT CO., LTD., Beijing (CN)

(72) Inventors: Jiaqing Wang, Beijing (CN); Fangchen Cheng, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 400 days.

(21) Appl. No.: 17/600,570

(22) PCT Filed: Mar. 25, 2020

(86) PCT No.: PCT/CN2020/081072
§ 371 (c)(1),
(2) Date: Sep. 30, 2021

(87) PCT Pub. No.: WO2020/200004
PCT Pub. Date: Oct. 8, 2020

(65) Prior Publication Data
US 2022/0174604 A1 Jun. 2, 2022

(30) Foreign Application Priority Data
Apr. 2, 2019 (CN) .......... 201910263111.4
Apr. 23, 2019 (CN) .......... 201910330382.7

(51) Int. Cl.
H04W 52/02 (2009.01)
H04L 5/00 (2006.01)
(Continued)

(52) U.S. Cl.
CPC ....... *H04W 52/0235* (2013.01); *H04L 5/0051* (2013.01); *H04W 52/0229* (2013.01); *H04W 72/046* (2013.01); *H04W 72/23* (2023.01)

(58) Field of Classification Search
CPC ... H04W 72/23; H04W 16/28; H04W 72/046; H04W 52/02; H04B 7/0695;
(Continued)

(56) References Cited

U.S. PATENT DOCUMENTS

2016/0337975 A1 11/2016 Li et al.
2016/0373237 A1 12/2016 Shellhammer et al.
(Continued)

FOREIGN PATENT DOCUMENTS

CN 103002550 A 3/2013
CN 105850224 A * 8/2016 ........... H04B 7/0695
(Continued)

OTHER PUBLICATIONS

Second Office Action and Search Report from CN app. No. 201910330382.7, dated Nov. 26, 2021, with English translation provided by Global Dossier, all pages.
(Continued)

*Primary Examiner* — Khalid W Shaheed
(74) *Attorney, Agent, or Firm* — Ladas & Parry, LLP

(57) ABSTRACT

A signal transmission method, a signal transmission apparatus and a device are provided. The signal transmission method includes: configuring at least one transmission beam, the transmission beam being a beam corresponding to a transmission resource for a power-saving signal; and transmitting the power-saving signal on the at least one transmission beam.

16 Claims, 2 Drawing Sheets

(51) Int. Cl.
*H04W 72/044* (2023.01)
*H04W 72/23* (2023.01)

(58) Field of Classification Search
CPC .... H04B 7/0617; H04B 7/088; H04B 7/0408; H04B 7/2041; H04B 7/1853; H04B 17/382
See application file for complete search history.

(56) References Cited

U.S. PATENT DOCUMENTS

| | | | |
|---|---|---|---|
| 2018/0255607 | A1 | 9/2018 | Nagaraja et al. |
| 2019/0045481 | A1 | 2/2019 | Sang et al. |
| 2019/0059129 | A1 | 2/2019 | Luo et al. |
| 2019/0074942 | A1 | 3/2019 | Moshfeghi |
| 2019/0305839 | A1 | 10/2019 | Zhang et al. |
| 2019/0373450 | A1 * | 12/2019 | Zhou .................... H04W 76/11 |
| 2020/0163074 | A1 | 5/2020 | Tang et al. |
| 2021/0119686 | A1 | 4/2021 | Tang |
| 2021/0160779 | A1 | 5/2021 | Liu |
| 2021/0367707 | A1 | 11/2021 | Wu et al. |

FOREIGN PATENT DOCUMENTS

| | | | |
|---|---|---|---|
| CN | 107735975 | A | 2/2018 |
| CN | 108024259 | A | 5/2018 |
| CN | 108207030 | A | 6/2018 |
| CN | 109155973 | A | 1/2019 |
| CN | 109219113 | A | 1/2019 |
| CN | 109302720 | A | 2/2019 |
| CN | 109462889 | A | 3/2019 |
| KR | 10-2018-0108397 | A | 10/2018 |
| WO | 2017/052596 | A1 | 3/2017 |
| WO | 2018/107363 | A1 | 6/2018 |
| WO | 2019028825 | A1 | 2/2019 |
| WO | 2019032886 | A1 | 2/2019 |
| WO | WO-2019183970 | A1 * | 10/2019 ........... H04L 5/0051 |

OTHER PUBLICATIONS

First Office Action from TW app. No. 109110472, dated Oct. 5, 2021, with machine English translation provided by applicant, all pages.
Huawei, HiSilicon, "On configurations and procedures of power saving signal", R1-1805964, 3GPP TSG RAN WG1 Meeting #93, Busan, Korea, May 21-25, 2018, all pages.
Qualcomm Incorporated, "Beam management for NR", R1-1809711, 3GPP TSG-RAN WG1 Meeting #94, Gothenburg, Sweden, Aug. 20-24, 2018, all pages.
Qualcomm Incorporated, "Triggering Adaptation of UE Power Consumption Characteristics", R1-1811283, 3GPP TSG-RAN WG1 Meeting #94bis, Chengdu, China, Oct. 8-12, 2018, all pages.
Qualcomm, "Wakeup Signaling for multi-beam systems", R2-1711703, Resubmission of R2-1709116, 3GPP TSG-RAN WG2 Meeting RAN2 #99bis, Prague, Czech, Oct. 9-13, 2017, all pages.
International Search Report from PCT/CN2020/081072, dated Dec. 17, 2020, with English translation provided by WIPO, all pages.
Written Opinion of the International Searching Authority from PCT/CN2020/081072, dated Dec. 17, 2020, with English translation provided by WIPO, all pages.
International Preliminary Report on Patentability from PCT/CN2020/081072, dated Sep. 28, 2021, with English translation provided by WIPO, all pages.
First Office Action and Search Report from CN app. No. 201910330382.7, dated Apr. 6, 2021, with English translation from Global Dossier, all pages.
Qualcomm Incorporated, "Wake-Up Signaling for C-DRX", R2-1709115, 3GPP TSG RAN WG2 NR #99, Aug. 21-25, 2017, Berlin, Germany, all pages.
CATT, "Summary of Offline Discussion on Triggering Adaptation of UE Power Consumption", R1-1814309, 3GPP TSG RAN WG1 Meeting #95, Spokane, U.S.A., Nov. 12-16, 2018, all pages.
Extended European Search Report for European Patent Application 20783757.6, issued on Apr. 14, 2022, all pages.
Office action from corresopnding Korean Patent Application No. 10-2021-7033624 dated Apr. 19, 2024, and its English translation.

* cited by examiner

SIGNAL TRANSMISSION METHOD, APPARATUS, AND DEVICE

CROSS-REFERENCE TO RELATED APPLICATIONS

This application is the U.S. national phase of PCT Application No. PCT/CN2020/081072 filed on Mar. 25, 2020, which claims priorities of the Chinese patent application No. 201910263111.4 filed in China on Apr. 2, 2019 and the Chinese patent application No. 201910330382.7 filed in China on Apr. 23, 2019, the disclosures of which are incorporated herein by reference in their entireties.

TECHNICAL FIELD

The present disclosure relates to the field of communications technology, in particular to a signal transmission method, a signal transmission apparatus, and a device.

BACKGROUND

During the communications at a high frequency band, in order to meet the requirements on coverage or throughput, currently a User Equipment (UE) at first performs beam scanning on the basis of a Synchronization Signal Block (SSB), and after determining a reception beam, the UE reports information of a selected beam to a base station implicitly through a preamble sequence carried by a Physical Random Access Channel (PRACH). The base station transmits necessary configuration information to the UE on the beam reported by the UE.

A problem in multi-beam transmission also occurs when a power-saving signal is transmitted at the high frequency band. Different from a Physical Downlink Shared Channel (PDSCH) or a Physical Downlink Control Channel (PDCCH) for data scheduling, the PDCCH/PDSCH may be transmitted multiple times with a beam management mechanism and a beam recovery mechanism, while a transmission beam for the power-saving signal probably changes along with the movement of the UE without any beam recovery mechanism. Hence, there is currently no scheme about how to transmit the power-saving signal on the basis of the beam.

SUMMARY

An object of the present disclosure is to provide a signal transmission method, a signal transmission apparatus and a device, so as to transmit the power-saving signal on the basis of the beam.

In one aspect, the present disclosure provides in some embodiments a signal transmission method for a network device, including: configuring at least one transmission beam, the transmission beam being a beam corresponding to a transmission resource for a power-saving signal; and transmitting the power-saving signal on the at least one transmission beam.

In a possible embodiment of the present disclosure, the configuring the at least one transmission beam includes configuring one transmission beam through high layer signaling or physical layer signaling.

In a possible embodiment of the present disclosure, the configuring the at least one transmission beam includes configuring at least two transmission beams through high layer signaling or physical layer signaling.

In a possible embodiment of the present disclosure, the configuring the at least one transmission beam includes: configuring at least two transmission resources, the transmission resources being resources corresponding to the power-saving signal; and configuring at least one transmission beam for each transmission resource.

In a possible embodiment of the present disclosure, the configuring the at least two transmission resources includes configuring the at least two transmission resources through high layer signaling.

In a possible embodiment of the present disclosure, the power-saving signal is a PDCCH-based power-saving signal, the signal transmission method further includes configuring a reference signal for each transmission beam, and different transmission beams corresponding to different reference signals.

In a possible embodiment of the present disclosure, the different transmission beams corresponding to the different reference signals comprise at least one of: that the reference signals corresponding to the different transmission beams are in a same sequence and have different patterns; that the reference signals corresponding to the different transmission beams are in different sequences and have a same pattern; or that the reference signals corresponding to the different transmission beams are in different sequences and have different patterns.

In a possible embodiment of the present disclosure, the transmitting the power-saving signal on the at least one transmission beam includes: selecting a target transmission beam from the at least one transmission beam; and transmitting the power-saving signal on the target transmission beam.

In a possible embodiment of the present disclosure, the transmitting the power-saving signal on the at least one transmission beam includes: transmitting the power-saving signal on at least two first time units through a same transmission beam in at least two transmission beams; or transmitting the power-saving signal on the at least two first time units through different transmission beams in the at least two transmission beams, different first time units corresponding to different transmission beams.

In a possible embodiment of the present disclosure, the signal transmission method further includes configuring at least two second time units, and different second time units correspond to different transmission resources.

In a possible embodiment of the present disclosure, the configuring the at least two second time units includes configuring the at least two second time units through high layer signaling, physical layer signaling or pre-agreement.

In a possible embodiment of the present disclosure, the transmitting the power-saving signal on the at least one transmission beam includes transmitting the power-saving signal on at least two second time units and on respective transmission resources corresponding to the at least two second time units through at least one transmission beam corresponding to the transmission resource.

In a possible embodiment of the present disclosure, the signal transmission method further includes configuring for a User Equipment (UE) priori information that is to be used by the UE to detect the transmission beam on a time unit, the time unit comprising a first time unit or a second time unit.

In a possible embodiment of the present disclosure, configuring for the UE the priori information that is to be used by the UE to detect the transmission beam on the time unit comprises: configuring for the UE through high layer signaling, physical layer signaling or pre-agreement, the priori information that is to be used by the UE to detect the transmission beam on the time unit.

In another aspect, the present disclosure provides in some embodiments a signal transmission method for a UE, including receiving a power-saving signal transmitted by a network device on at least one transmission beam.

In a possible embodiment of the present disclosure, the at least one transmission beam includes one transmission beam, and the receiving the power-saving signal transmitted by the network device on the at least one transmission beam includes receiving, on a reception beam corresponding to the transmission beam, the power-saving signal transmitted by the network device on the transmission beam.

In a possible embodiment of the present disclosure, the at least one transmission beam includes at least two transmission beams corresponding to a same power-saving signal. Subsequent to receiving the power-saving signal transmitted by the network device on the at least one transmission beam, the signal transmission method further includes determining a target transmission beam selected by the network device from the at least two transmission beams.

In a possible embodiment of the present disclosure, the determining the target transmission beam that is selected by the network device from the at least two transmission beams includes: detecting a reference signal corresponding to the transmission beam, different transmission beams corresponding to different reference signals; and when the reference signal has been detected, determining a transmission beam corresponding to the reference signal as the target transmission beam that is selected by the network device from the at least two transmission beams.

In a possible embodiment of the present disclosure, the receiving the power-saving signal transmitted by the network device on the at least one transmission beam includes receiving, on a same first time unit through at least two reception beams, the respective power-saving signals transmitted on the transmission beams corresponding to the at least two reception beams.

In a possible embodiment of the present disclosure, the receiving the power-saving signal transmitted by the network device on the at least one transmission beam includes receiving, on at least two first time units, the respective power-saving signals transmitted on at least two transmission beams, different first time units corresponding to different transmission beams. The determining the target transmission beam that is selected by the network device from the at least two transmission beams comprises: detecting the signal on the at least two transmission beams in accordance with pre-agreement, base station configuration or random selection; and when the power-saving signal has been detected, determining a transmission beam corresponding to the power-saving signal as the target transmission beam selected by the network device from the at least two transmission beams.

In a possible embodiment of the present disclosure, the receiving the power-saving signal transmitted by the network device on the at least one transmission beam includes receiving, on at least two second time units, the respective power-saving signals, wherein the respective power-saving signals are transmitted by the network device on the respective transmission resources corresponding to the at least two second time units through at least one transmission beam corresponding to the transmission resource, and the transmission resource is a resource corresponding to the power-saving signal.

In a possible embodiment of the present disclosure, subsequent to determining the transmission beam corresponding to the power-saving signal as the target transmission beam selected by the network device from the at least two transmission beams, the signal transmission method further comprises: demodulating and decoding a target power-saving signal corresponding to the target transmission beam; after the target power-saving signal has been demodulated and decoded successfully, instructing the UE to execute a target event, wherein the target event comprises waking up a receiver or entering a sleep mode.

In yet another aspect, the present disclosure provides in some embodiments a network device, including a transceiver, a memory, a processor, and a program stored in the memory and capable of being executed by the processor. The processor is configured to execute the program, so as to: configure at least one transmission beam, the transmission beam being a beam corresponding to a transmission resource for a power-saving signal; and transmit the power-saving signal on the at least one transmission beam.

In a possible embodiment of the present disclosure, the processor is further configured to execute the program so as to configure one transmission beam through high layer signaling or physical layer signaling.

In a possible embodiment of the present disclosure, the processor is further configured to execute the program so as to configure at least two transmission beams through high layer signaling or physical layer signaling.

In a possible embodiment of the present disclosure, the processor is further configured to execute the program so as to: configure at least two transmission resources, the transmission resources being resources corresponding to the power-saving signal; and configure at least one transmission beam for each transmission resource.

In a possible embodiment of the present disclosure, the processor is further configured to execute the program so as to configure the at least two transmission resources through high layer signaling.

In a possible embodiment of the present disclosure, the power-saving signal is a PDCCH-based power-saving signal, the processor is further configured to execute the program so as to configure a reference signal for the transmission beam, and different transmission beams corresponding to different reference signals.

In a possible embodiment of the present disclosure, the different transmission beams corresponding to the different reference signals comprise at least one of: that the reference signals corresponding to the different transmission beams are in a same sequence and have different patterns; that the reference signals corresponding to the different transmission beams are in different sequences and have a same pattern; or that the reference signals corresponding to the different transmission beams are in different sequences and have different patterns.

In a possible embodiment of the present disclosure, the processor is further configured to execute the program so as to: select a target transmission beam from the at least one transmission beam; and transmit the power-saving signal on the target transmission beam.

In a possible embodiment of the present disclosure, the processor is further configured to execute the program so as to: transmit the power-saving signal on at least two first time units through a same transmission beam in at least two transmission beams; or transmit the power-saving signal on the at least two first time units through different transmission beams in the at least two transmission beams, different first time units corresponding to different transmission beams.

In a possible embodiment of the present disclosure, the processor is further configured to execute the program so as to configure at least two second time units, and different second time units correspond to different transmission resources.

In a possible embodiment of the present disclosure, the processor is further configured to execute the program so as to configure the at least two second time units through high layer signaling, physical layer signaling or pre-agreement.

In a possible embodiment of the present disclosure, the processor is further configured to execute the program so as to transmit the power-saving signal on at least two second time units and on respective transmission resources corresponding to the at least two second time units through at least one transmission beam corresponding to the transmission resource.

In a possible embodiment of the present disclosure, the processor is further configured to execute the program so as to configure for a UE priori information that is to be used by the UE to detect the transmission beam on a time unit, and the time unit includes a first time unit or a second time unit.

In a possible embodiment of the present disclosure, the processor is further configured to execute the program so as to configure for the UE through high layer signaling, physical layer signaling or pre-agreement the priori information that is to be used by the UE to detect the transmission beam on the time unit.

In still yet another aspect, the present disclosure provides in some embodiments a network device, including: a first configuration module configured to configure at least one transmission beam, the transmission beam being a beam corresponding to a transmission resource for a power-saving signal; and a transmission module configured to transmit the power-saving signal on the at least one transmission beam.

In a possible embodiment of the present disclosure, the first configuration module includes a first configuration unit configured to configure one transmission beam through high layer signaling or physical layer signaling.

In a possible embodiment of the present disclosure, the first configuration module includes a second configuration unit configured to configure at least two transmission beams through high layer signaling or physical layer signaling.

In a possible embodiment of the present disclosure, the first configuration module includes: a third configuration unit configured to configure at least two transmission resources, the transmission resources being resources corresponding to the power-saving signal; and a fourth configuration unit configured to configure at least one transmission beam for each transmission resource.

In a possible embodiment of the present disclosure, the third configuration unit is specifically configured to configure at least two transmission resources through high layer signaling.

In a possible embodiment of the present disclosure, the power-saving signal is a PDCCH-based power-saving signal, the network device further includes a second configuration module configured to configure a reference signal for the transmission beam, and different transmission beams corresponding to different reference signals.

In a possible embodiment of the present disclosure, the different transmission beams corresponding to the different reference signals comprise one of: that the reference signals corresponding to the different transmission beams are in a same sequence and have different patterns; that the reference signals corresponding to the different transmission beams are in different sequences and have a same pattern; or that the reference signals corresponding to the different transmission beams are in different sequences and have different patterns.

In a possible embodiment of the present disclosure, the transmission module includes: a selection unit configured to select a target transmission beam from the at least one transmission beam; and a first transmission unit configured to transmit the power-saving signal on the target transmission beam.

In a possible embodiment of the present disclosure, the transmission module includes: a second transmission unit configured to transmit the power-saving signal on at least two first time units through a same transmission beam in at least two transmission beams; or a third transmission unit configured to transmit the power-saving signal on the at least two first time units through different transmission beams in the at least two transmission beams, different first time units corresponding to different transmission beams.

In a possible embodiment of the present disclosure, the network device further includes a third configuration module configured to configure at least two second time units, and different second time units correspond to different transmission resources.

In a possible embodiment of the present disclosure, the third configuration module includes a fifth configuration unit configured to configure the at least two second time units through high layer signaling, physical layer signaling or pre-agreement.

In a possible embodiment of the present disclosure, the transmission module includes a fourth transmission unit configured to transmit the power-saving signal on at least two second time units and on respective transmission resources corresponding to the at least two second time units through at least one transmission beam corresponding to the transmission resource.

In a possible embodiment of the present disclosure, the network device further includes a fourth configuration module configured to configure for a UE priori information that is to be used by the UE to detect the transmission beam on a time unit, and the time unit includes a first time unit or a second time unit.

In a possible embodiment of the present disclosure, the fourth configuration module includes a sixth configuration unit configured to configure for the UE through high layer signaling, physical layer signaling or pre-agreement the priori information that is to be used by the UE to detect the transmission beam on the time unit.

In still yet another aspect, the present disclosure provides in some embodiments a UE, including a transceiver, a memory, a processor, and a program stored in the memory and capable of being executed by the processor. The processor is configured to execute the program so as to receive a power-saving signal transmitted by a network device on at least one transmission beam.

In a possible embodiment of the present disclosure, the at least one transmission beam includes one transmission beam, and the processor is further configured to execute the program so as to receive, on a reception beam corresponding to the transmission beam, the power-saving signal transmitted by the network device on the transmission beam.

In a possible embodiment of the present disclosure, the at least one transmission beam includes at least two transmission beams corresponding to a same power-saving signal. The processor is further configured to execute the program so as to determine a target transmission beam selected by the network device from the at least two transmission beams.

In a possible embodiment of the present disclosure, the processor is further configured to execute the program so as to: detect a reference signal corresponding to the transmission beam, different transmission beams corresponding to different reference signals; and when the reference signal has been detected, determine a transmission beam corresponding to the reference signal as the target transmission beams selected by the network device from the at least two transmission beams.

In a possible embodiment of the present disclosure, the processor is further configured to execute the program so as to receive, on a same first time unit, the power-saving signal transmitted on each transmission beam through at least two reception beams corresponding to the transmission beams.

In a possible embodiment of the present disclosure, the processor is further configured to execute the program so as to: receive, on at least two first time units, the power-saving signals transmitted on at least two transmission beams, different first time units corresponding to different transmission beams; detect the power-saving signal on the at least two transmission beams in accordance with pre-agreement, base station configuration or random selection; and when the power-saving signal has been detected, determine a transmission beam corresponding to the power-saving signal as the target transmission beam selected by the network device from the at least two transmission beams.

In a possible embodiment of the present disclosure, the processor is further configured to execute the program so as to receive, on at least two second time units, the power-saving signal transmitted by the network device on respective transmission resources corresponding to the at least two second time units through at least one transmission beam corresponding to the transmission resource, and the transmission resource is a resource corresponding to the power-saving signal.

In a possible embodiment of the present disclosure, the processor is further configured to execute the program so as to: demodulate and decode a target power-saving signal corresponding to the target transmission beam; and after the target power-saving signal has been demodulated and decoded successfully, instruct the UE to execute a target event. The target event includes waking up a receiver or entering a sleep mode.

In still yet another aspect, the present disclosure provides in some embodiments a UE, including a reception module configured to receive a power-saving signal transmitted by a network device on at least one transmission beam.

In a possible embodiment of the present disclosure, the at least one transmission beam includes one transmission beam, and the reception module includes a first reception unit configured to receive, on a reception beam corresponding to the transmission beam, the power-saving signal transmitted by the network device on the transmission beam.

In a possible embodiment of the present disclosure, the at least one transmission beam includes at least two transmission beams corresponding to a same power-saving signal. The UE further includes a beam determination module configured to, upon the receipt of the power-saving signal transmitted by the network device on the at least one transmission beam, determine a target transmission beam selected by the network device from the at least two transmission beams.

In a possible embodiment of the present disclosure, the beam determination module includes: a first detection unit configured to detect a reference signal corresponding to the transmission beam, different transmission beams corresponding to different reference signals; and a first beam determination unit configured to, when the reference signal has been detected, determine a transmission beam corresponding to the reference signal as the target transmission beam selected by the network device from the at least two transmission beams.

In a possible embodiment of the present disclosure, the reception module includes a second reception unit configured to receive, on a same first time unit, the power-saving signal transmitted on each transmission beam through at least two reception beams corresponding to the transmission beams.

In a possible embodiment of the present disclosure, the reception module includes a third reception unit configured to receive, on at least two first time units, the power-saving signal transmitted on at least two transmission beams, and different first time units correspond to different transmission beams. The beam determination module includes: a second detection unit configured to detect the power-saving signal on the at least two transmission beams in accordance with pre-agreement, base station configuration or random selection; and a second beam determination unit configured to, when the power-saving signal has been detected, determine a transmission beam corresponding to the power-saving signal as the target transmission beam selected by the network device from the at least two transmission beams.

In a possible embodiment of the present disclosure, the reception module includes a fourth reception unit configured to receive, on at least two second time units, the power-saving signal transmitted by the network device on respective transmission resources corresponding to the at least two second time units through at least one transmission beam corresponding to the transmission resource, and the transmission resource is a resource corresponding to the power-saving signal.

In a possible embodiment of the present disclosure, the UE further includes: a demodulation and decoding module configured to demodulate and decode a target power-saving signal corresponding to the target transmission beam; and an instruction module configured to, after the target power-saving signal has been demodulated and decoded successfully, instruct the UE to execute a target event. The target event includes waking up a receiver or entering a sleep mode.

In still yet another aspect, the present disclosure provides in some embodiments a computer-readable storage medium storing therein a computer program. The computer program is executed by a processor so as to implement the steps of the above-mentioned signal transmission methods.

The present disclosure at least has the following beneficial effect.

According to the embodiments of the present disclosure, at least one transmission beam is configured, and the transmission beam is a beam corresponding to the transmission resource for the power-saving signal. Then, the power-saving signal is transmitted on the at least one transmission beam. As a result, it is able to transmit the power-saving signal on the basis of the beam, and enable the UE to execute the corresponding event in accordance with the instruction from the received power-saving signal, thereby to reduce the power consumption of the UE.

DETAILED DESCRIPTION

In order to make the objects, the technical solutions and the advantages of the present disclosure more apparent, the present disclosure will be described hereinafter in details in conjunction with the drawings and embodiments.

Figure 1:
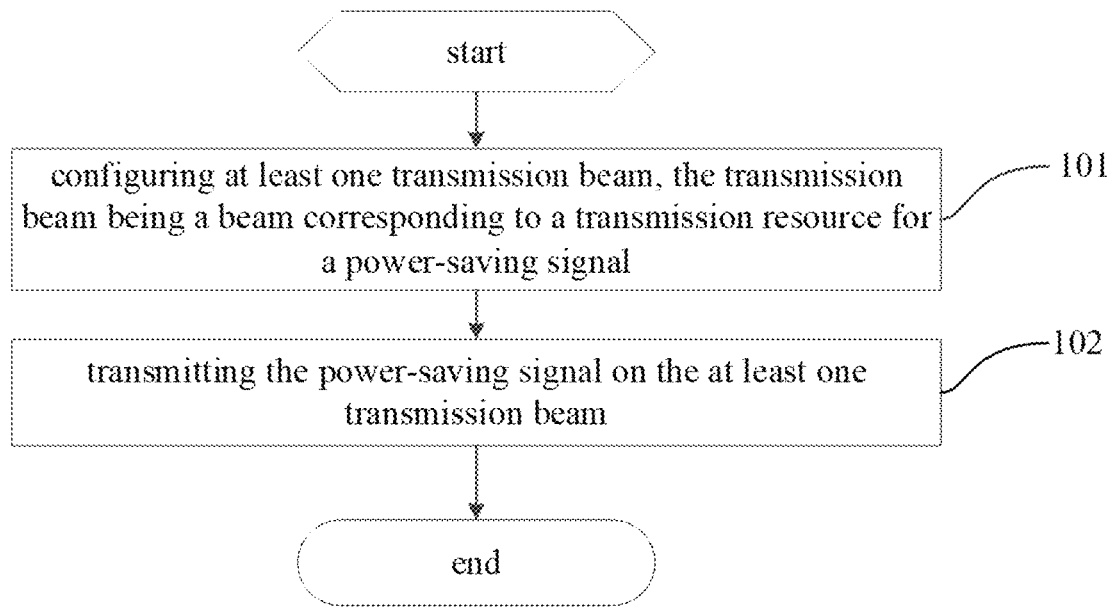
FIG. 1 is a flow chart of a signal transmission method according to an embodiment of the present disclosure.

As shown in FIG. 1, the present disclosure provides in some embodiments a signal transmission method for a network device, which includes the following steps.

Step 101: configuring at least one transmission beam, the transmission beam being a beam corresponding to a transmission resource for a power-saving signal.

Here, the network device configures the at least one transmission beam, i.e., one or more transmission beams, for the transmission resource for each power-saving signal.

It should be appreciated that, the transmission resource for the power-saving signal is specifically a resource for transmitting the power-saving signal.

Here, the transmission resource for the power-saving signal refers to a time and a frequency for transmitting the power-saving signal, with the possibility of the other resources, e.g., a code division resource and a spatial resource, being inclusive.

Step 102: transmitting the power-saving signal on the at least one transmission beam.

In this step, to be specific, the power-saving signal is transmitted on the at least one transmission beam through the transmission resource corresponding to the power-saving signal.

According to the embodiments of the present disclosure, at least one transmission beam is configured, and the transmission beam is a beam corresponding to the transmission resource for the power-saving signal. Then, the power-saving signal is transmitted on the at least one transmission beam. As a result, it is able to transmit the power-saving signal on the basis of the beam, and enable a UE to execute the corresponding event in accordance with the instruction from the received power-saving signal, thereby to reduce the power consumption of the UE.

Based on FIG. 1, as a preferred implementation mode, Step 101 includes configuring one transmission beam through high layer signaling or physical layer signaling.

In this step, to be specific, one transmission beams is configured for the transmission resource for the power-saving signal through the high layer signaling or physical layer signaling.

In a preferred embodiment of the present disclosure, the network device (e.g., a base station) configures for the UE a transmission resource for a UE-specific or UE group-specific power-saving signal through Radio Resource Control (RRC) signaling semi-statically or statically in a pre-agreed manner. Then, one transmission beam is configured for the power-saving signal through the RRC signaling. In a preferred embodiment of the present disclosure, the power-saving signal is a sequence-based power-saving signal. It should be noted that, the power-saving signal in any other form shall also not be excluded.

Based on FIG. 1, as a possible implementation mode, Step 101 includes configuring at least two transmission beams through high layer signaling or physical layer signaling.

In this step, to be specific, at least two transmission beams, i.e., a plurality of transmission beams, are configured for the transmission resource for the power-saving signal through high layer signaling or physical layer signaling.

Based on FIG. 1, as a preferred implementation mode, Step 101 includes: configuring at least two transmission resources, the transmission resources being resources corresponding to the power-saving signal; and configuring at least one transmission beam for each transmission resource.

In this step, to be specific, at least two transmission resources are configured through high layer signaling. Here, the high layer signaling includes high layer RRC signaling or a Media Access Control (MAC) Control Element (CE).

It should be noted that, the at least two transmission resources are also configured through physical layer signaling. Here, the physical layer signaling includes physical layer PDCCH signaling.

It should be appreciated that, the network device may configure a plurality of transmission resources, and then configure at least one transmission beam for each transmission resource in the plurality of transmission resources.

The network device further configures a transmission resource A, and then configures at least one transmission beam for the transmission resource A; next, the network device configures a transmission resource B, and then configures at least one transmission beam for the transmission resource B, and so on, until n transmission resources have been configured and at least one transmission beam has been configured for each transmission resource.

Further, the power-saving signal is a PDCCH-based power-saving signal. The signal transmission method further includes configuring a reference signal for each transmission beam, and different transmission beams corresponding to different reference signals.

To be specific, when different transmission beams corresponding to different reference signals, the reference signals corresponding to the different transmission beams are in a same sequence and have different patterns; or the reference signals corresponding to the different transmission beams are in different sequences and have a same pattern; or the reference signals corresponding to the different transmission beams are in different sequences and have different patterns.

It should be appreciated that, when a sequence of the reference signal is associated with beam information, the reference signals corresponding to the different transmission beams have different sequences, and beam information associated with the sequences of the reference signals is different. To be specific, information of beam index in an initial phase of a gold sequence for generating the sequences of the reference signals is different.

In an instance, the power-saving signal is a PDCCH-based power-saving signal. The network device configures a plurality of transmission beams for a transmission resource for the power-saving signal, i.e., Control Resource Set (CORESET), and configures different Demodulation Reference Signals (DMRSs) for different transmission beams. In other words, the DMRSs configured for different transmission beams are different. To be specific, DMRSs patterns configured for different transmission beams are different.

Here, usually the transmission beam may include a plurality of aggregation levels, and the DMRS patterns configured for different aggregation levels are different.

Based on FIG. 1, as an optional implementation mode, Step 102 includes: selecting a target transmission beam in the at least one transmission beam; and transmitting the power-saving signal on the target transmission beam.

In this step, to be specific, the network device selects the target transmission beam from the at least one transmission beam in accordance with channel transmission quality of the UE.

For example, the network device obtains from the UE the channel transmission quality of a channel environment where the UE is located, and selects the target transmission beam adapted to the channel transmission quality of the UE from the at least one transmission beam in accordance with the channel transmission quality of the UE.

Here, when the target transmission beam is adapted to the channel transmission quality of the UE, the power-saving signal is transmitted by the network device to a receiver of the UE with good signal quality through the target transmission beam.

When the network device configures at least two transmission beams through the high layer signaling or physical layer signaling, as an optional implementation mode, Step 102 includes transmitting the power-saving signal on at least two first time units through a same transmission beam in at least two transmission beams.

In this step, the power-saving signal is transmitted through a same transmission beam at a plurality of positions (in a preferred embodiment of the present disclosure, on a plurality of first time units).

For example, upon the receipt of channel quality information reported by the UE, the network device (e.g., base station) transmits the power-saving signal on a transmission beam selected in the at least two transmission beams (i.e., a same transmission beam) on a plurality of first time units. In this way, it is able for the power-saving signal to be transmitted by the network device to the receiver of the UE with good signal quality.

As another possible implementation mode, Step 102 includes transmitting the power-saving signal on the at least two first time units through different transmission beams in the at least two transmission beams, and different first time units correspond to different transmission beams.

In this step, different first time units correspond to different transmission beams, i.e., there is a correspondence between the first time units and the transmission beams.

For example, when the network device (e.g., base station) fails to obtain the channel quality information reported by the UE, the network device transmits the power-saving signal on different transmission beams in the at least two transmission beams, so as to at least ensure that the power-saving signal is received by the UE.

When the network device configures at least two transmission resources corresponding to the power-saving signal and configures at least one transmission beam for each transmission resource, as a possible implementation mode, the signal transmission method further includes configuring at least two second time units, and different second time units correspond to different transmission resources.

In this step, to be specific, the at least two second time units are configured through high layer signaling, physical layer signaling or pre-agreement.

For example, the transmission time unit (i.e., the second time unit) for the power-saving signal corresponding to each transmission resource is configured through high layer RRC signaling, an MAC CE or pre-agreement.

Based on the above, Step 102 further includes transmitting the power-saving signal on at least two second time units and on respective transmission resources corresponding to the at least two second time units through at least one transmission beam corresponding to the transmission resource.

It should be appreciated that, the base station has different transmission beams on different transmission resources, so the second time unit is a sum of a time for transmitting the power-saving signal through the transmission beam and a time for switching the beams by the network device. In other words, apart from the time for transmitting the power-saving signal through the transmission beam, the second time unit further includes the reserved time for switching the beams by the network device.

Usually, a length of the second time unit is greater than a length of the first time unit mentioned hereinabove.

In an instance, when the power-saving signal is a PDCCH-based power-saving signal, the network device (e.g., base station) configures T CORESETs for the PDCCH-based power-saving signal, and configures W transmission beams for each CORESET, where W≥1 and W is a positive integer.

The network device transmits the same power-saving signal on each transmission beam sequentially on different second time units and on different CORESETs.

For example, T=2 or 3, and W=1. As predefined by the network device, each transmission time unit (i.e., the second time unit) includes K OFDM symbols, and the network device transmits the power-saving signal once on a corresponding transmission beam on one CORESET.

It should be appreciated that, the transmission beams of the network device on different CORESETs are different, so the K OFDM symbols include the reserved time for switching the beams by the network device.

When W>1, i.e., when more than one transmission beam is configured on each CORESET, the network device transmits the power-saving signal on W transmission beams corresponding to a current CORESET sequentially on each transmission time unit, i.e., K OFDM symbols, or transmits the power-saving signal on the transmission beams corresponding to the current CORESET, the quantity of the transmission beams is greater than or equal to 1 and smaller than W.

It should be appreciated that, the power-saving signals transmitted on the plurality of CORESETs and the corresponding transmission beams are a same power-saving signal.

In order to implement the above steps and improve the accuracy of the power-saving signal received by the UE, the signal transmission method further includes configuring for a UE priori information that is to be used by the UE to detect the transmission beam on a time unit, and the time unit includes a first time unit or a second time unit.

To be specific, this step includes configuring for the UE through high layer signaling, physical layer signaling or pre-agreement, the priori information that is to be used by the UE to detect the transmission beam on the time unit.

Here, the priori information of the transmission beam at least includes, but not limited to, a correspondence between the time units and the transmission beams. In other words, different time units correspond to different transmission beams. Here, the priority information is configured by the network device (specifically, semi-statically configured through RRC signaling) or obtained through a static configuration pre-agreed with the UE. In this way, the UE is capable of detecting different beams.

According to the signal transmission method in the embodiments of the present disclosure, at least one transmission beam is configured, and the transmission beam is a beam corresponding to the transmission resource for the power-saving signal. Then, the power-saving signal is transmitted on the at least one transmission beam. As a result, it is able to transmit the power-saving signal on the basis of the beam, and enable the UE to execute the corresponding event in accordance with the instruction from the received power-saving signal, thereby to reduce the power consumption of the UE.

Figure 2:
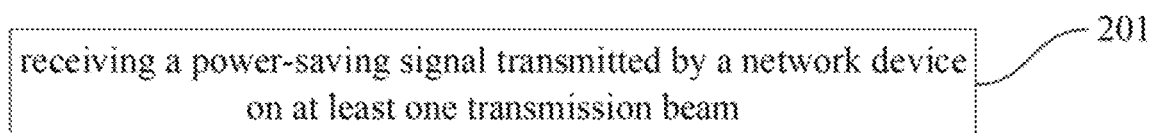
FIG. 2 is another flow chart of the signal transmission method according to an embodiment of the present disclosure.

As shown in FIG. 2, the present disclosure provides in some embodiments a signal transmission method for a UE, which includes Step 201 of receiving a power-saving signal transmitted by a network device on at least one transmission beam.

In this step, the at least one transmission beam includes one or more transmission beams.

It should be appreciated that, the network device configures at least one transmission beam for a transmission resource corresponding to the power-saving signal, and after the configuration, notifies it to the UE through high layer signaling or physical layer signaling. The UE is aware of the at least one transmission beam configured by the network device, and provides a corresponding reception beam with respect to each transmission beam.

In other words, in this step, to be specific, the power-saving signal transmitted by the network device on the at least one transmission beam is received through the reception beam.

According to the signal transmission method in the embodiments of the present disclosure, the power-saving signal transmitted by the network device on the at least one transmission beam is received, so it is able to transmit the power-saving signal on the basis of the beam, and enable the UE to execute the corresponding event in accordance with the instruction from the received power-saving signal, thereby to reduce the power consumption of the UE.

Based on FIG. 2, as a preferred implementation mode, the at least one transmission beam includes one transmission beam. Step 201 includes receiving, on a reception beam corresponding to the transmission beam, the power-saving signal transmitted by the network device on the transmission beam.

Here, the network device configures one transmission beams for the transmission resource corresponding to the power-saving signal, so the UE is aware of the transmission beam through the signaling from the network device, and provides a corresponding reception beam with respect to the transmission beam. In this way, it is able to save the resources and reduce the complexity of the UE while ensuring that the power-saving signal is received by the UE accurately on the reception beam corresponding to the transmission beam.

Based on FIG. 2, as a possible implementation mode, the at least one transmission beam includes at least two transmission beams corresponding to a same power-saving signal. Subsequent to Step 201, the signal transmission method further includes determining a target transmission beam selected by the network device from the at least two transmission beams.

It should be appreciated that, the UE does not know the transmission beam on which the power-saving signal is transmitted by the network device, so it does not know the reception beam on which the power-saving signal is to be received by the UE. In order to determine the reception beam for receiving the power-saving signal, reduce the power consumption and increase a success rate of demodulating and decoding the power-saving signal, it is necessary to determine the target transmission beam selected by the network device from the at least two transmission beams.

Based on the above, in the case that the power-saving signal is a PDCCH-based power-saving signal and the network device configures a reference signal for the transmission beam, correspondingly, as a possible implementation mode, the step of determining the target transmission beam that is selected by the network device from the at least two transmission beams specifically includes: detecting a reference signal corresponding to each transmission beam, different transmission beams corresponding to different reference signals; and when the reference signal has been detected, determining a transmission beam corresponding to the reference signal as the target transmission beam selected by the network device from the at least two transmission beams.

In this step, specifically, hypothesis detection is performed on a DMRS for the PDCCH-based power-saving signal corresponding to each transmission beam. In a possible embodiment of the present disclosure, the hypothesis detection is performed in accordance with simple sequence correlation.

Here, to be specific, when merely one reference signal has been detected, the transmission beam corresponding to the reference signal is determined as the target transmission beam selected by the network device from the at least two transmission beams.

When at least two reference signals have been detected, a transmission beam corresponding to a target reference signal in the at least two reference signals is determined as the target transmission beam selected by the network device from the at least two transmission beams. In a preferred embodiment of the present disclosure, channel transmission quality corresponding to the target reference signal is greater than a predetermined threshold.

In this step, when the reference signal has been detected and the transmission beam corresponding to the reference signal is determined as the target transmission beam selected by the network device from the at least two transmission beams, the UE demodulates and decodes the power-saving signal received on a target reception beam corresponding to the target transmission beam; otherwise, the UE does not demodulate and decode the power-saving signal. In this way, it is able to reduce the power consumption, and increase a success rate of demodulating and decoding the power-saving signal.

Here, in the case that the transmission beams include at least two transmission beams corresponding to a same power-saving signal, as a possible implementation mode, Step 201 includes receiving, on a same first time unit, the power-saving signal transmitted on each transmission beam through at least two reception beams corresponding to the transmission beams.

It should be appreciated that, this implementation mode corresponds to a situation where the network device configures at least two transmission beams for the transmission resource for the power-saving signal and configures the reference signal for each transmission beam, and different transmission beams corresponding to different reference signals.

A behavior of the UE continues to be described hereinafter with the instance in the method for the corresponding network device as an example. The power-saving signal is the PDCCH-based power-saving signal, and the network device configures a plurality of transmission beams for the CORESET of the power-saving signal and configures different DMRSs for different transmission beams, i.e., the DMRSs configured for the different transmission beams are different. The network device (e.g., base station) transmits the power-saving signal on the selected beam. When the UE at first receives the power-saving signal corresponding to a plurality of transmission beams, e.g., high-frequency simulated beams, in a preferred embodiment of the present disclosure, the UE receives the power-saving signal on N transmission beams through N reception beams on a same first time unit, where N≥2 and N is a positive integer.

Next, hypothesis detection is performed on the DMRS of the PDCCH-based power-saving signal corresponding to each transmission beam. In a possible embodiment of the present disclosure, the hypothesis detection is preferably performed in accordance with simple sequence correlation. When the UE has detected the DMRS corresponding to the transmission beam at a corresponding beam reception position, the UE performs a complex channel decoding operation.

Here, when the power-saving signal transmitted on the transmission beams is received through at least two reception beams on a same first time unit, it means that the UE receives the power-saving signal transmitted on the transmission beams simultaneously through at least two beams on the same first time unit.

It should be appreciated that, the UE is capable of receiving a plurality of beams on the same first time unit. Generally speaking, e.g., antennae of the UE need to be provided with a plurality of panels.

As another preferred implementation mode, Step 101 includes receiving, on at least two first time units, the power-saving signal transmitted on at least two transmission beams, and different first time units correspond to different transmission beams.

In a possible embodiment of the present disclosure, the determining the target transmission beam that is selected by the network device from the at least two transmission beams specifically includes: detecting the power-saving signal on the at least two transmission beams in accordance with pre-agreement, base station configuration or random selection; and when the power-saving signal has been detected, determining a transmission beam corresponding to the power-saving signal as the target transmission beam selected by the network device from the at least two transmission beams.

It should be appreciated that, this implementation mode corresponds a situation where the network device configures at least two transmission beams for the transmission resource for the power-saving signal and transmits the power-saving signal on different transmission beams in the at least two transmission beams on at least two first time units.

In other words, the network device transmits the power-saving signal on a plurality of transmission time units on a selected transmission beam in a plurality of transmission beams. Correspondingly, the UE detects different transmission beams at different Monitoring Occasions (MOs) of the power saving signal through pre-agreement, base station configuration or random selection. For example, the base station configures a correspondence between the different first time units (e.g., different MOs) and the transmission beams semi-statically through RRC signaling, or statically through pre-agreement with the UE, so that the UE performs the detection with respect to different beams.

It should be appreciated that, the MO is described from the perspective of the UE, and a transmission occasion of the power-saving signal is described from the perspective of the network device. There is a one-to-one correspondence between them, so they will not be differentiated from each other herein.

More specifically, the base station configures M transmission beams for the transmission resource for the power-saving signal, e.g., the CORESET corresponding to the PDCCH-based power-saving signal. For example, M=2. The base station selects one transmission beam in accordance with a channel environment where the UE is located, and transmits the power-saving signal on a plurality of transmission occasions. Alternatively, the base station transmits the power-saving signal on a plurality of transmission beams on different first time units (e.g., a plurality of power-saving signal transmission occasions). The UE receives the power-saving signal on a plurality of MOs in accordance with the different transmission beams adopted by the base station. In other words, the UE performs the hypothesis detection on a plurality of beam transmission directions on the plurality of MOs.

Here, the beam direction detected by the UE on the MO is semi-statically configured by the base station through RRC signaling, statically configured through pre-agreement, or randomly selected by the base station.

For example, on the MO with an odd-numbered index, it is assumed by the UE that the transmission beam of the base station is a transmission beam 1, and then the UE detects the power-saving signal. On the MO with an even-numbered index, it is assumed by the UE that the transmission beam of the base station is a transmission beam 2, and then the UE detects the power-saving signal. When there is no priori information about how to detect the transmission beam, the UE randomly and alternately detects the transmission beams. For example, on a current MO, it is assumed by the UE that the transmission beam is 1 or 2 for the detection, and on a next MO, it is assumed by the UE that the transmission beam is 2 or 1 for the detection.

Based on FIG. 2, as a preferred implementation mode, Step 201 includes receiving, on at least two second time units, the power-saving signal transmitted by the network device on respective transmission resources corresponding to the at least two second time units through at least one transmission beam corresponding to the transmission resource, and the transmission resource is a resource corresponding to the power-saving signal.

It should be appreciated that, this implementation mode corresponds to a situation where the network device configures at least two transmission resources corresponding to the power-saving signal and configures at least one transmission beam for each transmission resource.

A behavior of the UE continues to be described hereinafter with the instance in the method for the network device as an example. When the power-saving signal is the PDCCH-based power-saving signal, the network device (e.g., base station) configures T CORESETs for the PDCCH-based power-saving signal, and configures W transmission beams for each CORESET, where W≥1 and W is a positive integer. The network device transmits the same power-saving signal on the corresponding transmission beams sequentially on different second time units and on different CORESETs.

Correspondingly, the UE receives, on the corresponding transmission time units (i.e., the second time units) the power-saving signal transmitted on different CORESETs and different beams.

It should be appreciated that, from the perspective of a UE node, a subsequent beam scanning operation is stopped as long as the UE has demodulated and decoded the power-saving signal on one beam corresponding to one CORESET.

As another possible implementation mode, the UE detects a DMRS corresponding to a PDCCH on one beam corresponding to different CORESETs, and demodulates and decodes the power-saving signal only when the DMRS has been detected. When no DMRS has been detected, the UE does not demodulate and decode the power-saving signal. When a plurality of DMRS sequences has been detected by the base station, the UE selects a DMRS sequence with good channel transmission quality to demodulate and decode the corresponding PDCCH-based power-saving signal.

As a preferred implementation mode, subsequent to determining the transmission beam corresponding to the power-saving signal as the target transmission beam selected by the network device from the at least two transmission beams, the signal transmission method further includes: demodulating and decoding a target power-saving signal corresponding to the target transmission beam; and after the target power-saving signal has been demodulated and decoded successfully, instructing the UE to execute a target event. The target event includes waking up a receiver or entering a sleep mode.

In this step, after determining the target transmission beam that is selected by the network device from the at least two transmission beams, the target power-saving signal corresponding to the target transmission beam is demodulated and decoded, and the other transmission beams are not processed. In this way, it is able to reduce the power consumption of the UE, and increase a success rate of demodulating and decoding the power-saving signal.

In this step, it should be appreciated that, the target event includes, but not limited to, waking up the receiver or entering the sleep mode.

According to the signal transmission method in the embodiments of the present disclosure, the power-saving signal transmitted by the network device on the at least one transmission beam is received. As a result, it is able to transmit the power-saving signal on the basis of the beam, and enable the UE to execute the corresponding event in accordance with the instruction from the received power-saving signal, thereby to reduce the power consumption of the UE.

Figure 3:
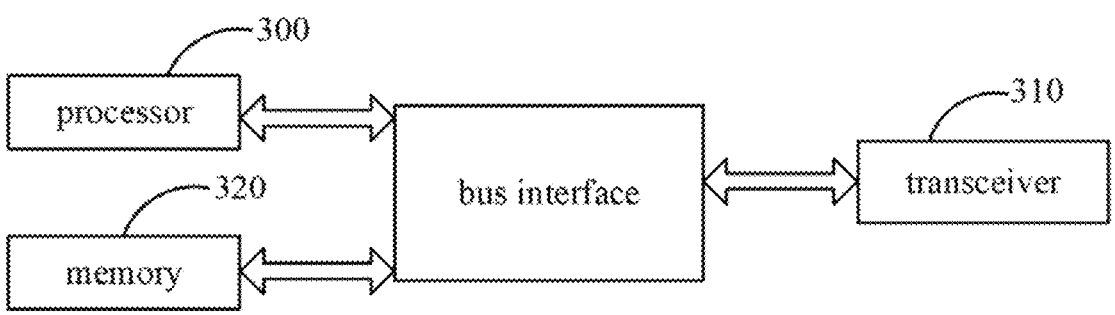
FIG. 3 is a block diagram of a network device according to an embodiment of the present disclosure.

As shown in FIG. 3, the present disclosure provides in some embodiments a network device, which includes a transceiver 310, a memory 320, a processor 300, and a program stored in the memory and capable of being executed by the processor. The processor 300 is configured to execute the program in the memory 320, so as to: configure at least one transmission beam, the transmission beam being a beam corresponding to a transmission resource for a power-saving signal; and transmit the power-saving signal on the at least one transmission beam.

In FIG. 3, bus architecture may include a number of buses and bridges connected to each other, so as to connect various circuits for one or more processors 300 and one or more memories 320. In addition, as is known in the art, the bus architecture may be used to connect any other circuits, such as a circuit for a peripheral device, a circuit for a voltage stabilizer and a power management circuit. A bus interface may be provided, and the transceiver 310 may consist of a plurality of elements, i.e., a transmitter and a receiver for communication with any other devices over a transmission medium. The processor 300 may take charge of managing the bus architecture as well as general processings. The memory 320 may store therein data for the operation of the processor 300.

In a possible embodiment of the present disclosure, the processor 300 is further configured to execute the program so as to configure one transmission beam through high layer signaling or physical layer signaling.

In a possible embodiment of the present disclosure, the processor is further configured to execute the program so as to configure at least two transmission beams through high layer signaling or physical layer signaling.

In a possible embodiment of the present disclosure, the processor 300 is further configured to execute the program so as to: configure at least two transmission resources, the transmission resources being resources corresponding to the power-saving signal; and configure at least one transmission beam for each transmission resource.

In a possible embodiment of the present disclosure, the processor 300 is further configured to execute the program so as to configure the at least two transmission resources through high layer signaling.

In a possible embodiment of the present disclosure, the power-saving signal is a PDCCH-based power-saving signal, the processor 300 is further configured to execute the program so as to configure a reference signal for each transmission beam, and different transmission beams corresponding to different reference signals.

In a possible embodiment of the present disclosure, when different transmission beams correspond to different reference signals, the reference signals corresponding to the different transmission beams are in a same sequence and have different patterns; or the reference signals corresponding to the different transmission beams are in different sequences and have a same pattern; or the reference signals corresponding to the different transmission beams are in different sequences and have different patterns.

In a possible embodiment of the present disclosure, the processor 300 is further configured to execute the program so as to: select a target transmission beam from the at least one transmission beam in accordance with channel transmission quality of a UE; and transmit the power-saving signal on the target transmission beam.

In a possible embodiment of the present disclosure, the processor 300 is further configured to execute the program so as to: transmit the power-saving signal on at least two first time units through a same transmission beam in at least two transmission beams; or transmit the power-saving signal on the at least two first time units through different transmission beams in the at least two transmission beams, different first time units corresponding to different transmission beams.

In a possible embodiment of the present disclosure, the processor 300 is further configured to execute the program so as to configure at least two second time units, and different second time units correspond to different transmission resources.

In a possible embodiment of the present disclosure, the processor 300 is further configured to execute the program so as to configure the at least two second time units through high layer signaling, physical layer signaling or pre-agreement.

In a possible embodiment of the present disclosure, the processor 300 is further configured to execute the program so as to transmit the power-saving signal on at least two second time units and on respective transmission resources corresponding to the at least two second time units through at least one transmission beam corresponding to the transmission resource.

In a possible embodiment of the present disclosure, the processor 300 is further configured to execute the program so as to configure for a UE priori information that is to be used by the UE to detect the transmission beam on a time unit, and the time unit includes a first time unit or a second time unit.

In a possible embodiment of the present disclosure, the processor 300 is further configured to execute the program so as to configure for the UE the priori information that is to be used by the UE to detect the transmission beam on the time unit through high layer signaling, physical layer signaling or pre-agreement.

Figure 4:
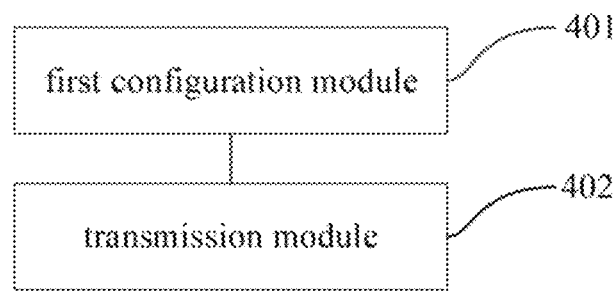
FIG. 4 is a schematic view showing modules of the network device according to an embodiment of the present disclosure.

As shown in FIG. 4, the present disclosure further provides in some embodiments a network device, which includes: a first configuration module 401 configured to configure at least one transmission beam, the transmission beam being a beam corresponding to a transmission resource for a power-saving signal; and a transmission module 402 configured to transmit the power-saving signal on the at least one transmission beam.

In a possible embodiment of the present disclosure, the first configuration module 401 includes a first configuration unit configured to configure one transmission beam through high layer signaling or physical layer signaling.

In a possible embodiment of the present disclosure, the first configuration module 401 includes a second configuration unit configured to configure at least two transmission beams through high layer signaling or physical layer signaling.

In a possible embodiment of the present disclosure, the first configuration module 401 includes: a third configuration unit configured to configure at least two transmission resources, the transmission resources being resources corresponding to the power-saving signal; and a fourth configuration unit configured to configure at least one transmission beam for each transmission resource.

In a possible embodiment of the present disclosure, the third configuration unit is specifically configured to configure at least two transmission resources through high layer signaling.

In a possible embodiment of the present disclosure, the power-saving signal is a PDCCH-based power-saving signal, the network device further includes a second configuration module configured to configure a reference signal for each transmission beam, and different transmission beams corresponding to different reference signals.

In a possible embodiment of the present disclosure, when different transmission beams correspond to different reference signals, the reference signals corresponding to the different transmission beams are in a same sequence and have different patterns; or the reference signals corresponding to the different transmission beams are in different sequences and have a same pattern; or the reference signals corresponding to the different transmission beams are in different sequences and have different patterns.

In a possible embodiment of the present disclosure, the transmission module 402 includes: a selection unit configured to select a target transmission beam from the at least one transmission beam; and a first transmission unit configured to transmit the power-saving signal on the target transmission beam.

In a possible embodiment of the present disclosure, the transmission module 402 includes: a second transmission unit configured to transmit the power-saving signal on at least two first time units through a same transmission beam in at least two transmission beams; or a third transmission unit configured to transmit the power-saving signal on at least two first time units through different transmission beams in the at least two transmission beams, different first time units corresponding to different transmission beams.

In a possible embodiment of the present disclosure, the network device further includes a third configuration module configured to configure at least two second time units, and different second time units correspond to different transmission resources.

In a possible embodiment of the present disclosure, the third configuration module includes a fifth configuration unit configured to configure the at least two second time units through high layer signaling, physical layer signaling or pre-agreement.

In a possible embodiment of the present disclosure, the transmission module 402 includes a fourth transmission unit configured to transmit the power-saving signal on at least two second time units and on respective transmission resources corresponding to the at least two second time units through at least one transmission beam corresponding to the transmission resource.

In a possible embodiment of the present disclosure, the network device further includes a fourth configuration module configured to configure for a UE priori information that is to be used by the UE to detect the transmission beam on a time unit, and the time unit includes a first time unit or a second time unit.

In a possible embodiment of the present disclosure, the fourth configuration module includes a sixth configuration unit configured to configure for the UE the priori information that is to be used by the UE to detect the transmission beam on the time unit through high layer signaling, physical layer signaling or pre-agreement.

According to the network device in the embodiments of the present disclosure, the at least one transmission beam corresponding to the transmission resource for the power-saving signal is configured by the first configuration module, and the power-saving signal is transmitted by the transmission module on the at least one transmission beam. As a result, it is able to transmit the power-saving signal on the basis of the beam, and enable the UE to execute the corresponding event in accordance with the instruction from the received power-saving signal, thereby to reduce the power consumption of the UE.

The present disclosure further provides in some embodiments a computer-readable storage medium storing therein a computer program. The computer program is executed by a processor so as to: configure at least one transmission beam, the transmission beam being a beam corresponding to a transmission resource for a power-saving signal; and transmit the power-saving signal on the at least one transmission beam.

The computer program is executed by the processor so as to implement the steps of the method for the network device as shown in FIG. 1, which will not be further particularly defined herein.

Figure 5:
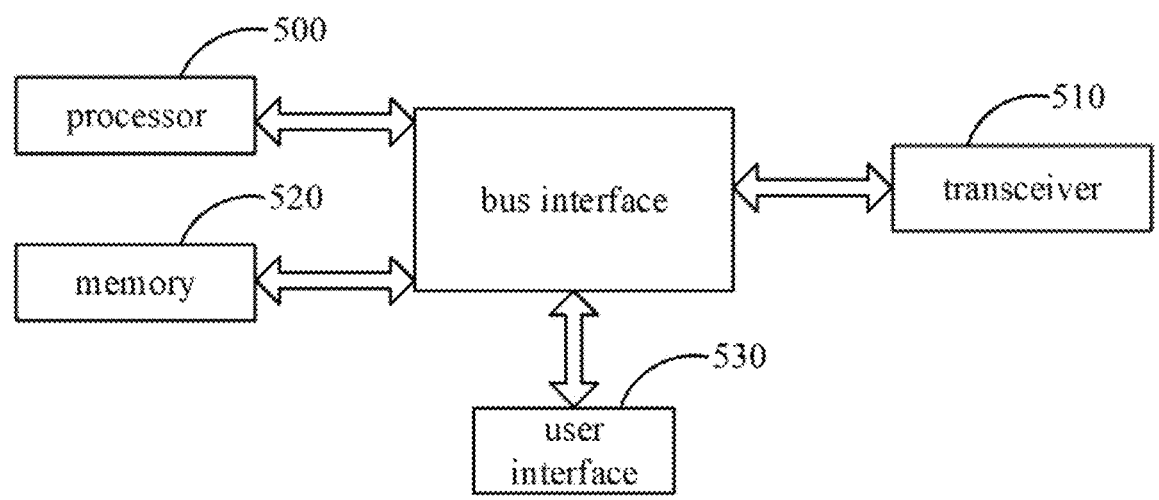
FIG. 5 is a block diagram of a UE according to an embodiment of the present disclosure.

As shown in FIG. 5, the present disclosure further provides in some embodiments a UE, which includes a transceiver 510, a memory 520, a processor 500, and a program stored in the memory 520 and executed by the processor 500. The processor 500 is configured to read and execute the program in the memory 520 so as to receive a power-saving signal transmitted by a network device on at least one transmission beam.

In FIG. 5, the bus architecture may include a number of buses and bridges connected to each other, so as to connect various circuits for one or more processors 500 and one or more memories 520. In addition, as is known in the art, the bus architecture may be used to connect any other circuits, such as a circuit for a peripheral device, a circuit for a voltage stabilizer and a power management circuit. A bus interface may be provided, and the transceiver 510 may consist of a plurality of elements, i.e., a transmitter and a receiver for communication with any other devices over a transmission medium. With respect to different UEs, a user interface 530 may also be provided for devices which are to be arranged inside or outside the UE, and these devices may include but not limited to a keypad, a display, a speaker, a microphone and a joystick.

The processor 500 may take charge of managing the bus architecture as well as general processings. The memory 520 may store therein data for the operation of the processor 500.

In a possible embodiment of the present disclosure, the at least one transmission beam includes one transmission beam, and the processor 500 is further configured to execute the program so as to receive, on a reception beam corresponding to the transmission beam, the power-saving signal transmitted by the network device on the transmission beam.

In a possible embodiment of the present disclosure, the at least one transmission beam includes at least two transmission beams corresponding to a same power-saving signal. The processor 500 is further configured to execute the program so as to determine a target transmission beam selected by the network device from the at least two transmission beams.

In a possible embodiment of the present disclosure, the processor 500 is further configured to execute the program so as to: detect a reference signal corresponding to each transmission beam, different transmission beams corresponding to different reference signals; and when the reference signal has been detected, determine a transmission beam corresponding to the reference signal as the target transmission beam selected by the network device from the at least two transmission beams.

In a possible embodiment of the present disclosure, the processor 500 is further configured to execute the program so as to receive, on a same first time unit, the power-saving signal transmitted on each transmission beam through at least two reception beams corresponding to the transmission beams.

In a possible embodiment of the present disclosure, the processor 500 is further configured to execute the program so as to: receive, on at least two first time units, the power-saving signal transmitted on at least two transmission beams, different first time units corresponding to different transmission beams; detect the power-saving signal on the at least two transmission beams in accordance with pre-agreement, base station configuration or random selection; and when the power-saving signal has been detected, determine a transmission beam corresponding to the power-saving signal as the target transmission beam selected by the network device from the at least two transmission beams.

In a possible embodiment of the present disclosure, the processor 500 is further configured to execute the program so as to receive, on at least two second time units, the power-saving signal transmitted by the network device on respective transmission resources corresponding to the at least two second time units through at least one transmission beam corresponding to the transmission resource, and the transmission resource is a resource corresponding to the power-saving signal.

In a possible embodiment of the present disclosure, the processor 500 is further configured to execute the program so as to: demodulate and decode a target power-saving signal corresponding to the target transmission beam; and after the target power-saving signal has been demodulated and decoded successfully, instruct the UE to execute a target event. The target event includes waking up a receiver or entering a sleep mode.

Figure 6:
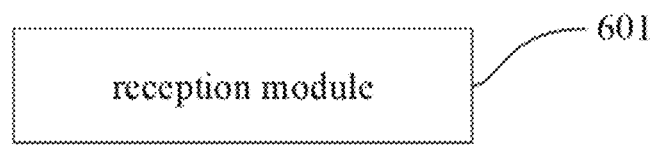
FIG. 6 is a schematic view showing modules of the UE according to an embodiment of the present disclosure.

As shown in FIG. 6, the present disclosure further provides in some embodiments a UE, which includes a reception module 601 configured to receive a power-saving signal transmitted by a network device on at least one transmission beam.

In a possible embodiment of the present disclosure, the at least one transmission beam includes one transmission beam, and the reception module 601 includes a first reception unit configured to receive, on a reception beam corresponding to the transmission beam, the power-saving signal transmitted by the network device on the transmission beam.

In a possible embodiment of the present disclosure, the at least one transmission beam includes at least two transmission beams corresponding to a same power-saving signal. The UE further includes a beam determination module configured to, upon the receipt of the power-saving signal transmitted by the network device on the at least one transmission beam, determine a target transmission beam selected by the network device from the at least two transmission beams.

In a possible embodiment of the present disclosure, the beam determination module includes: a first detection unit configured to detect a reference signal corresponding to each transmission beam, different transmission beams corresponding to different reference signals; and a first beam determination unit configured to, when the reference signal has been detected, determine a transmission beam corresponding to the reference signal as the target transmission beam selected by the network device from the at least two transmission beams.

In a possible embodiment of the present disclosure, the reception module 601 includes a second reception unit configured to receive, on a same first time unit, the power-saving signal transmitted on each transmission beam through at least two reception beams corresponding to the transmission beams.

In a possible embodiment of the present disclosure, the reception module 601 includes a third reception unit configured to receive, on at least two first time units, the power-saving signal transmitted on at least two transmission beams, and different first time units correspond to different transmission beams. The beam determination module includes: a second detection unit configured to detect the power-saving signal on the at least two transmission beams in accordance with pre-agreement, base station configuration or random selection; and a second beam determination unit configured to, when the power-saving signal has been detected, determine a transmission beam corresponding to the power-saving signal as the target transmission beam selected by the network device from the at least two transmission beams.

In a possible embodiment of the present disclosure, the reception module 601 includes a fourth reception unit configured to receive, on at least two second time units, the power-saving signal transmitted by the network device on respective transmission resources corresponding to the at least two second time units through at least one transmission beam corresponding to the transmission resource, and the transmission resource is a resource corresponding to the power-saving signal.

In a possible embodiment of the present disclosure, the UE further includes: a demodulation and decoding module configured to demodulate and decode a target power-saving signal corresponding to the target transmission beam; and an instruction module configured to, after the target power-saving signal has been demodulated and decoded successfully, instruct the UE to execute a target event. The target event includes waking up a receiver or entering a sleep mode.

According to the UE in the embodiments of the present disclosure, the power-saving signal transmitted by the network device on the at least one transmission beam is received by the reception module. As a result, it is able to transmit the power-saving signal on the basis of the beam, and enable the UE to execute the corresponding event in accordance with the instruction from the received power-saving signal, thereby to reduce the power consumption of the UE.

The present disclosure further provides in some embodiments a computer-readable storage medium storing therein a computer program. The computer program is executed by a processor so as to receive a power-saving signal transmitted by a network device on at least one transmission beam.

The computer program is executed by the processor so as to implement the steps of the method for the UE as shown in FIG. 2, which will not be further particularly defined herein.

It should be further appreciated that, serial numbers of the steps shall not be used to define the order of the steps, and instead, the order of the steps shall be determined in accordance with their functions and internal logics.

It should be further appreciated that, the above modules are divided merely on the basis of their logic functions, and in actual use, they may be completely or partially integrated into a physical entity, or physically separated from each other. These modules may be implemented by calling software through a processing element, and/or implemented in the form of hardware. For example, the determination module may be a processing element arranged separately, or integrated into a chip of the above-mentioned device. In addition, these modules may be stored in the memory of the above-mentioned device in the form of a program code, and may be called and executed by a processing element of the above-mentioned device so as to achieve the functions of the determination module. The other modules may be implemented in a similar manner. All or parts of the modules may be integrated together or arranged separately. Here, the modules, units or assemblies may each of an Integrated Circuit (IC) having a signal processing capability. During the implementation, the steps of the method or the modules may be implemented through an integrated logic circuit of the processing element in the form of hardware or through instructions in the form of software.

For example, the modules, units, sub-units or sub-modules may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of system-on-a-chip (SOC).

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. In addition, the expression "and/or" in the description and the appended claims is merely used to represent at least one of the objects before and after the expression. For example, "A and/or B and/or C" represents seven situations, i.e., there is only A, there is only B, there is only C, there are both A and B, there are both B and C, thereby are both A and C, and there are A, B and C. Similarly, the phrase "at least one of A and B" in the specification and the appended claims shall be understood as "there is only A, there is only B, or there are both A and B".

The above are preferred embodiments of the present disclosure. It should be noted that, a person skilled in the art may make further modifications and improvements without departing from the principle of the present disclosure, and these modifications and improvements shall also fall within the scope of the present disclosure.

What is claimed is:

1. A signal transmission method for a network device, comprising:
   configuring at least one transmission beam, the transmission beam being a beam corresponding to a transmission resource for a power-saving signal, and the at least one transmission beam corresponding to a same power-saving signal; and
   transmitting the power-saving signal on the at least one transmission beam;
   wherein the configuring the at least one transmission beam comprises:
   configuring at least one CORESET, the at least one CORESET being resources corresponding to the power-saving signal; and
   configuring at least one transmission beam for each of the at least one CORESET;
   wherein the transmitting the power-saving signal on the at least one transmission beam comprises:
   selecting a target transmission beam from the at least one transmission beam;
   transmitting the power-saving signal on the target transmission beam;
   or
   transmitting the power-saving signal on at least two first time units through a same transmission beam in at least two transmission beams;
   or
   transmitting the power-saving signal on the at least two first time units through different transmission beams in the at least two transmission beams, different first time units corresponding to different transmission beams.

2. The signal transmission method according to claim 1, wherein the configuring the at least one transmission beam comprises:
   configuring at least one transmission beam through high layer signaling or physical layer signaling.

3. The signal transmission method according to claim 1, wherein the power-saving signal is a Physical Downlink Control Channel (PDCCH)-based power-saving signal, the signal transmission method further comprises:
   configuring a reference signal for the transmission beam, different transmission beams corresponding to different reference signals.

4. The signal transmission method according to claim 3, wherein the different transmission beams corresponding to the different reference signals comprise at least one of:
that the reference signals corresponding to the different transmission beams are in a same sequence and have different patterns;
that the reference signals corresponding to the different transmission beams are in different sequences and have a same pattern; or
that the reference signals corresponding to the different transmission beams are in different sequences and have different patterns.

5. The signal transmission method according to claim 1, further comprising:
configuring at least two second time units, different second time units corresponding to different CORESETs.

6. The signal transmission method according to claim 5, wherein the configuring the at least two second time units comprises:
configuring the at least two second time units through high layer signaling, physical layer signaling or pre-agreement.

7. The signal transmission method according to claim 5, wherein the transmitting the power-saving signal on the at least one transmission beam comprises:
transmitting the power-saving signal on at least two second time units and on respective CORESETs corresponding to the at least two second time units through at least one transmission beam corresponding to the CORESET.

8. The signal transmission method according to claim 1, further comprising:
configuring for a User Equipment (UE) priori information that is to be used by the UE to detect the transmission beam on a time unit, the time unit comprising a first time unit or a second time unit.

9. The signal transmission method according to claim 8, wherein the configuring for the UE the priori information that is to be used by the UE to detect the transmission beam on the time unit comprises:
configuring for the UE through high layer signaling, physical layer signaling or pre-agreement, the priori information that is to be used by the UE to detect the transmission beam on the time unit.

10. A signal transmission method for a UE, comprising:
receiving a power-saving signal transmitted by a network device on at least one transmission beam, the at least one transmission beam corresponding to a same power-saving signal;
wherein the power-saving signal is configured to be corresponding to at least one CORESET, for each of the at least one CORESET, at least one transmission beam is configured;
wherein the power-saving signal is transmitted by the network device in the following manners:
selecting a target transmission beam from the at least one transmission beam;
transmitting the power-saving signal on the target transmission beam;
or
transmitting the power-saving signal on at least two first time units through a same transmission beam in at least two transmission beams;
or
transmitting the power-saving signal on the at least two first time units through different transmission beams in the at least two transmission beams, different first time units corresponding to different transmission beams.

11. The signal transmission method according to claim 10, wherein the transmission beam comprises one transmission beam;
the receiving the power-saving signal transmitted by the network device on the at least one transmission beam comprises:
receiving, on a reception beam corresponding to the transmission beam, the power-saving signal transmitted by the network device on the transmission beam.

12. The signal transmission method according to claim 10, wherein there are at least two transmission beams corresponding to a same power-saving signal;
subsequent to receiving the power-saving signal transmitted by the network device on the at least one transmission beam, the signal transmission method further comprises:
determining a target transmission beam that is selected by the network device from the at least two transmission beams.

13. The signal transmission method according to claim 12, wherein the determining the target transmission beam that is selected by the network device from the at least two transmission beams comprises:
detecting a reference signal corresponding to the transmission beam, different transmission beams corresponding to different reference signals;
when the reference signal has been detected, determining the transmission beam corresponding to the reference signal as the target transmission beam that is selected by the network device from the at least two transmission beams.

14. The signal transmission method according to claim 12, wherein the receiving the power-saving signal transmitted by the network device on the at least one transmission beam comprises:
receiving, on a same first time unit through at least two reception beams, the respective power-saving signals transmitted on the transmission beams corresponding to the at least two reception beams.

15. A network device, comprising a transceiver, a memory, a processor, and a program stored in the memory and capable of being executed by the processor, wherein the processor is configured to execute the program to:
configure at least one transmission beam, the transmission beam being a beam corresponding to a transmission resource for a power-saving signal, and the at least one transmission beam corresponding to a same power-saving signal; and
transmit the power-saving signal on the at least one transmission beam,
wherein the processor is further configured to:
configure at least one CORESET, the at least one CORESET being resources corresponding to the power-saving signal; and
configure at least one transmission beam for each of the at least one CORESET;
wherein the processor is further configured to:
select a target transmission beam from the at least one transmission beam;
transmit the power-saving signal on the target transmission beam;
or
transmit the power-saving signal on at least two first time units through a same transmission beam in at least two transmission beams;

or
transmit the power-saving signal on the at least two first time units through different transmission beams in the at least two transmission beams, different first time units corresponding to different transmission beams.

16. A UE, comprising a transceiver, a memory, a processor, and a program stored in the memory and capable of being executed by the processor, wherein the processor is configured to execute the program to implement the signal transmission method according to claim 10.

* * * * *